United States Patent [19]
Lambert

[11] 3,829,977
[45] Aug. 20, 1974

[54] BEARING CHECK GAGE

[75] Inventor: William O. Lambert, Long Beach, Calif.

[73] Assignee: McDonnell Douglas Corporation, Santa Monica, Calif.

[22] Filed: July 27, 1972

[21] Appl. No.: 275,711

[52] U.S. Cl. ......... 33/174 E, 33/169 B, 33/DIG. 18
[51] Int. Cl. ................. G01b 13/14, G01b 13/18, G01b 13/16
[58] Field of Search ........... 33/174 R, 174 E, 178 F, 33/DIG. 18, 169 B

[56] References Cited
UNITED STATES PATENTS

| | | | |
|---|---|---|---|
| 1,469,343 | 10/1923 | Strong | 33/174 E UX |
| 1,602,645 | 10/1926 | Buckingham | 33/174 E |
| 2,405,648 | 8/1946 | Gray | 33/174 E |
| 2,514,794 | 7/1950 | Prince | 33/DIG. 18 |
| 3,426,272 | 2/1969 | Griffin | 33/174 E X |
| 3,503,133 | 3/1970 | Bogue et al. | 33/169 B |
| 3,549,182 | 12/1970 | Bogue | 33/169 B X |
| 3,559,292 | 2/1971 | Weissman | 33/169 B |

Primary Examiner—John W. Huckert
Assistant Examiner—Milton S. Gerstein
Attorney, Agent, or Firm—Robert O. Richardson; Walter J. Jason; Donald L. Royer

[57] ABSTRACT

A reverse hammer connected to a tapered bearing check pin having a dyed surface for making frictional contact of the pin with a tapered hole. Upon removal from the hole, the dyed surface of the pin provides a pattern indicating the condition of the tapered hole in the work piece.

3 Claims, 5 Drawing Figures

PATENTED AUG 20 1974 3,829,977

BEARING CHECK GAGE

BACKGROUND OF THE PRESENT INVENTION

Tapered holes are often drilled through associated workpieces for the passage of tapered bolts therethrough to fasten the workpieces together. In an ideal situation there will be 100 percent contact between the tapered bolt and the tapered wall surface of the hole. Heretofore in the inspection of tapered holes, both the hole and the tapered check pin have had slow-dry layout ink applied to them. The pin is then driven into the hole with a mallet and then the mallet is used from the reverse side to remove the pin from the hole. The pin in most cases pops out like a projectile and the person's hand usually smears the ink in grasping or catching it. Moreover, enclosure assemblies like aircraft wings, fuselages and tanks present a problem in pounding out the set pin from the reverse side of the assembly.

SUMMARY OF THE PRESENT INVENTION

The bearing check gage of the present invention provides for a series of tapered check pins of various sizes and degree of taper for attachment to an impact assembly. This assembly is used to drive the pins firmly into tapered holes in a workpiece and to remove them again. The tapered hole surface is then inspected to determine its acceptability for the insertion of a similarly tapered pin or bolt for the fastening of the workpieces through the tapered hole. This is done by checking the pattern on the dyed surface on the check pin. This must be a radial pattern substantially throughout the length of the pin seated in the workpiece to be acceptable. This impact assembly not only sets the pin within the hole but also withdraws it when a reverse motion is applied to the assembly by the operator.

DETAILED DESCRIPTION OF THE DRAWINGS

DETAILED DESCRIPTION OF AN ILLUSTRATIVE EMBODIMENT

Figure 1:
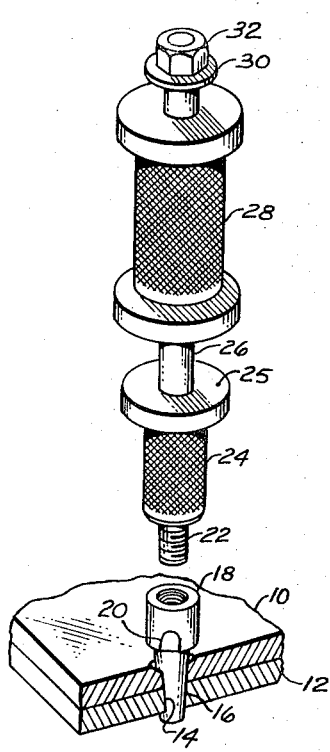
FIG. 1 is a perspective view of the bearing check gage.

Refering now to FIG. 1 there is shown a workpiece 10 and a workpiece 12 having a tapered hole 14 therethrough made for the insertion of a tapered bolt in fastening the two pieces together. Within this hole is shown a tapered set pin comprising a tapered shank 16 of the desired length, diameter and degree of taper for which the tapered hole 14 has been made to correspond. At the upper end of this pin is an internally threaded connector 18 having flats 20 on the outer surface for engagement with a wrench if needed. This connector is threadingly engagable over the lower end 22 of lower handle 24. Lower handle 24 is connected at its upper surface 25 to a shaft 26 over which a driver 28 reciprocates when manually driven. At the upper end of shaft 26 is a collar 30 held in place by a nut 32 threadingly mounted to the shaft 26.

Figure 2:
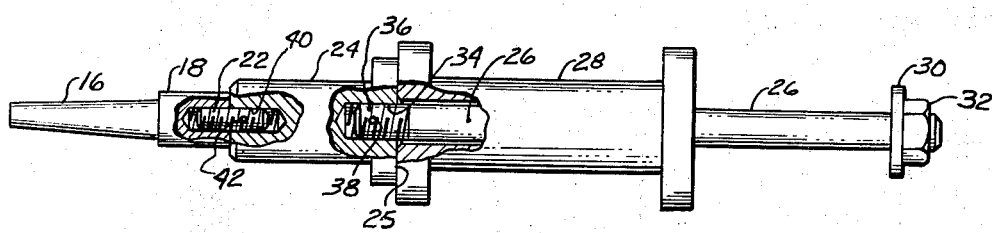
FIG. 2 is a side view with parts broken away to show its assembly.

As can be seen in FIG. 2 the lower handle 24 has a threaded opening 34 in the top 25 thereof into which is threadedly inserted the lower end 36 of the shaft 26. End 36 is locked in position with a lock pin 38. Similarly, threaded shaft 22 is threadedly engaged into the other end 40 of lower handle 24 and locked in position with a lock pin 42. Check pin with tapered shank 16 is thus threadedly engagable with the lower handle 24 through the threaded shaft 22. Lower handle 24 is not normally detachable from shaft 26 although, of course, the removal of lock pin 38 will permit its disassembly.

In operation, driver 28 may be given a downward stroke against upper surface 25 of lower handle 24 in driving the tapered shank 16 into the hole and conversely an upward stroke of driver 28 against collar 30 will affect removal of the check pin from the hole 14.

A preferred method of applying the blue dye is to apply it to a small pad of cheesecloth or equivalent and with this pad coat the shank bearing area 16 of the check pin. The film of dye should be applied very lightly and smoothed out such as by rubbing with light finger pressure. The insertion of the pin into the hole normally is done with 3 or 4 solid strokes of the impact tool. It then may be removed by reversing the direction of the impact tool. The check pin should not be rotated either on installation or removal from the hole.

Figure 3:
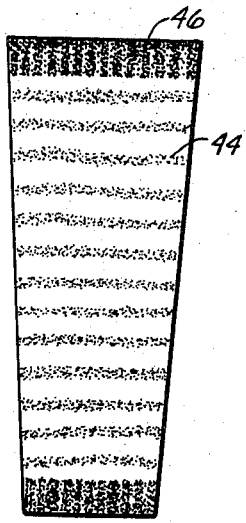
FIG. 3 shows an acceptable radial pattern on the dyed surface of the check pin and FIGS. 4 and 5 show unacceptable patterns on the check pin.

All holes for tapered shank fasteners must be concentric to dimensions specified, and must have a finish free of chips, scratches, gauling or rifling. The lighter dye and concentric rings 44 on check pin 46 in FIG. 3 is evidence of such a satisfactory hole.

Figure 4:
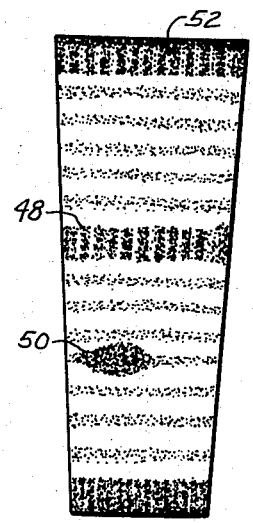

In FIG. 4 darker ring 48 and spotted portion 50 of darker colored dye indicates that those portions have not been in contact with the hole and thus the hole does not make satisfactory contact with the check pin 52.

Figure 5:
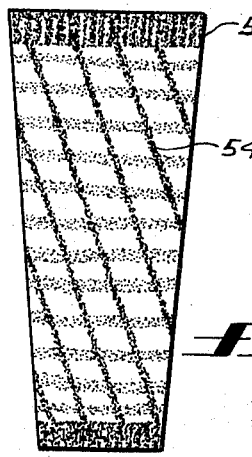

In FIG. 5 there are rifling marks 54 on pin 56 which also indicates an unsatisfactorily drilled hole. Reworking by grinding, reaming or the making of an oversize hole represent solutions when such a problem occurs.

Having thus described an illustrative embodiment of the present invention it is to be understood that modifications are possible and are part of the invention as set forth in the intended claims.

What is claimed is:

1. A bearing check gage for examining the surface of a tapered conical hole in a workpiece, said gage comprising:
    an impact assembly,
    a check pin having a tapered shank corresponding in diameter and degree of taper with a tapered fastener to be inserted into said hole,
    said shank being coated with a marking dye that indicates frictional contact with said hole,
    said impact assembly including a shaft having a driver thereon adapted for reciprocally slidable movement therealong,
    said shaft being removably affixed at its lower end to said shank whereby a downward stroke of said driver causes it to drive said shank into frictional contract with said hole,
    said shaft having stop means on its upper end for contact with said driver upon an upper stroke thereof to thereby remove said shank from said hole and expose said marking dye on said shank to view.

2. A bearing check gage as set forth in claim 1, said gage including a handle member connectable with said shank and said shaft is connected to said handle member whereby a downward stroke of said driver impacts said driver against said handle member.

3. A bearing check gage as in claim 2 wherein said shank has a threaded opening in the top thereof, said handle member has threaded connection means engagable with said opening.

* * * * *